Patented Dec. 13, 1949

2,491,045

UNITED STATES PATENT OFFICE 2,491,045

METHOD OF STABILIZING SOIL

August Holmes, Cranford, N. J., assignor to Standard Oil Development Company, a corporation of Delaware No Drawing. Application December 29, 1945, Serial No. 638,438

3 Claims. (Cl. 106—94)

This invention relates to the stabilization of soil for road building or other structural purposes and more particularly to the stabilization of soil by mixing therewith a resin and other ingredients.

The composition of soils used in the road building depends upon the geological processes involved in their formation and deposition by which the percentage of clay, silt and sand varies extensively. Various methods have been proposed to stabilize soils, i. e. to render them more or less immune to the effects of changes of moisture conditions to which they may be subjected. One method is to blend soils of various particle sizes and physico-chemical properties to produce a stable grading of the soil particles. For example, a soil which is hard and resistive to abrasive and impact action of traffic may provide for interlocking of the soil grains. The stability of the hard soil mixture is increased by the incorporation of appropriate amounts of finer material such as silt and a quantity of clay to bind the soil mass together and thereby produce a soil mixture having high shear resistance. The preparation of such stabilized blended soil requires close control in the grading and blending.

Another method of stabilizing the soil has been in blending with the soil a mixture of Portland cement and pine wood resin prepared from pine wood, preferably from stump pine wood. The resinous material is extracted with a coal-tar hydrocarbon, such as benzol or toluol, and the extract freed of volatile constituents to obtain the resin. The proportions of Portland cement and resin used are about 3 to 1.

The soils which are to be stabilized are tested according to the Hubbard-Field strength tests carried out as follows:

(A) *Soil-water-Portland cement-resin mixes.*—After determining the water exudation value of the soil, soil-water mixes were prepared to contain total moisture equivalent to 0 (air dry), 12.5, 25, 50 and 100 percent of the water exudation value. For each moisture percentage, Portland cement-resin mix was added in amount equal to 0.5, 1.0, 2.0, 4.0, 8.0 and 12.0 percent of the oven dry soil. Soil-water-Portland cement-resin mixtures were prepared in two different ways:

(a) The required amount of water was added to the soil soil-water mixture allowed to stand 16–24 hours in a closed container and then the desired amount of Portland cement-resin mix thoroughly admixed;

(b) The Portland cement-resin mix was added to the air-dry soil, then required amount of water mixed in and the total mixture allowed to stand over night.

Two inch diameter x one inch high briquettes were molded from the soil-water-Portland cement-resin mixes under 10,000 pounds Hubbard-Field compaction, the briquettes weighed and measured for wet and dry soil densities and the Hubbard-Field strengths obtained before and after the water immersion test of 7 days at 1⅛" immersion, and the water absorption and swell calculated on the specimens after water absorption.

According to this invention, it was found that the soil stabilized by the use of the Portland cement-resin mixture method, though stable as to moisture, did not pass a high Hubbard-Field strength test, and it has been found that, if the soil is first treated with lime, greater strength after water absorption and greater resistance towards disintegration by water were obtained as illustrated by the following tables:

Portland cement-resin mixture in soil stabilization
Effect of various amounts of water added to mix
Hubbard-Field test procedure

[Order of adding ingredients: Air dry soil, water, Portland cement, resin mixture.]

| Portland Cement-Resin Mixture Added, Wt. Per cent.. | 0.5 | 1.0 | 2.0 | 4.0 | 8.0 | 12.0 |
|---|---|---|---|---|---|---|
| SILTY CLAY SOIL | | | | | | |
| A. Preparation of Mix: | | | | | | |
| Water Added, Per Cent Exudation Value | 100 | 100 | 100 | 100 | 100 | 100 |
| Water Added, Wt. Per Cent | 18 | 18 | 18 | 18 | 18 | 18 |
| Hubbard-Field Strength, lbs: | | | | | | |
| Before 7 days Water Absorp | 600 | 875 | 1,125 | 1,550 | 2,300 | 2,875 |
| After 7 days Water Absorp | 50 | 175 | 250 | 975 | 1,600 | 2,575 |
| B. Preparation of Mix: | | | | | | |
| Water Added, Per Cent Exudation Value | 50 | 50 | 50 | 50 | 50 | 50 |
| Water Added, Wt. Per Cent | 9 | 9 | 9 | 9 | 9 | 9 |
| Hubbard-Field Strength, lbs: | | | | | | |
| Before 7 days Water Absorp | 7,125 | (¹) | (¹) | (¹) | (¹) | (¹) |
| After 7 days Water Absorp | Disintegrate in 10 mins | | | Disintegrate ½ hr. | Disintegrate in 24 hrs. | |

SILTY CLAY SOIL+10% LIME

[Order of adding ingredients: Air dry soil, lime, Portland cement, resin mixture, water.]

| | 0.5 | 1.0 | 2.0 | 4.0 | 8.0 | 12.0 |
|---|---|---|---|---|---|---|
| A. Preparation of Mix: | | | | | | |
| Water Added, Per Cent Exudation Value | 100 | 100 | 100 | 100 | 100 | 100 |
| Water Added, Wt. Per Cent | 20 | 20 | 20 | 20 | 20 | 20 |
| Lime Added, Wt. Per Cent | 10 | 10 | 10 | 10 | 10 | 10 |
| Hubbard-Field Strength—lbs.: | | | | | | |
| Before 7 days Water Absorp | 1,850 | 2,100 | 2,300 | 2,475 | 2,725 | 3,5 00 |
| After 7 days Water Absorp | 1,750 | 1,850 | 1,825 | 2,550 | 3,000 | 3,300 |
| B. Preparation of Mix: | | | | | | |
| Water Added, Per Cent Exudation Value | 50 | 50 | 50 | 50 | 50 | 50 |
| Water Added, Per Cent Wt | 9 | 9 | 9 | 9 | 9 | 9 |
| Lime Added, Wt. Per Cent | 10 | 10 | 10 | 10 | 10 | 10 |
| Hubbard-Field Strength—lbs.: | | | | | | |
| Before 7 days Water Absorp | 10,000 | 10,000 | 10,000 | 10,000 | 10,000 | 10,0 00 |
| After 7 days Water Absorp | Disintegrate 1 hr. | 1,350 | 1,725 | 3,150 | 4,450 | 6,300 |

¹ Strengths not taken because of rapid disintegration of specimens.

The percentages of lime used may vary from 1–15% and that of the Portland cement-resin mixture from 0.2 to 20%. The Portland cement resin mixture contains up to 30% of resin, preferably pine wood resins.

What is claimed is:

1. An improved method of stabilizing soil containing clay which comprises admixing with a soil containing clay from about 1% to 15% of lime, then adding from about 0.2% to 20% of a mixture of Portland cement and a resin, said resin being secured from pine wood by extraction with a coal tar hydrocarbon solvent followed by the removal of the solvent from the resin, said mixture of cement and resin being in the ratio of about 3 of cement to 1 of resin.

2. Process as defined by claim 1 wherein the amount of lime admixed with said soil containing clay is about 10%.

3. Process as defined by claim 2 wherein said coal tar hydrocarbon solvent is selected from the class consisting of benzol and toluol.

AUGUST HOLMES.

REFERENCES CITED

The following references are of record in the file of this patent:

UNITED STATES PATENTS

| Number | Name | Date |
|---|---|---|
| 303,213 | Cooke | Aug. 5, 1884 |
| 2,370,983 | Miller | Mar. 6, 1945 |